(12) United States Patent
Tisbo

(10) Patent No.: US 7,891,617 B2
(45) Date of Patent: Feb. 22, 2011

(54) MOUNTING BRACKET FOR SLAT WALLS

(75) Inventor: Peter Tisbo, Elk Grove Village, IL (US)

(73) Assignee: Custom Plastics, Inc., Elk Grove Village, IL (US)

( * ) Notice: Subject to any disclaimer, the term of this patent is extended or adjusted under 35 U.S.C. 154(b) by 0 days.

(21) Appl. No.: 12/465,359

(22) Filed: May 13, 2009

(65) Prior Publication Data

US 2010/0288891 A1 Nov. 18, 2010

(51) Int. Cl.
*A47B 96/06* (2006.01)

(52) U.S. Cl. ............... 248/220.22; 248/220.41; 248/220.43; 248/300

(58) Field of Classification Search ......... 52/36.05; 211/87.01; 248/220.22, 220.31, 220.41, 248/221.11, 220.43, 201, 300, 301
See application file for complete search history.

(56) References Cited

U.S. PATENT DOCUMENTS

| | | | |
|---|---|---|---|
| 3,425,568 A | | 2/1969 | Albright |
| 3,724,792 A | * | 4/1973 | Thalenfeld ............. 248/220.41 |
| 4,607,753 A | * | 8/1986 | Radek .................... 211/94.01 |
| 4,662,592 A | | 5/1987 | Garfinkle |
| 4,944,416 A | * | 7/1990 | Petersen et al. ............. 52/36.5 |
| 5,651,522 A | * | 7/1997 | Davis et al. ............ 248/221.11 |
| 5,671,851 A | * | 9/1997 | Johnson et al. ............... 211/51 |
| 5,791,093 A | * | 8/1998 | Diamond .................... 52/36.5 |
| 6,119,878 A | * | 9/2000 | Zen ......................... 211/94.01 |
| 6,837,384 B2 | * | 1/2005 | Secondino ............... 211/87.01 |
| 2006/0266901 A1 | * | 11/2006 | Tallman ................. 248/220.43 |
| 2007/0120030 A1 | * | 5/2007 | Dittmer ................. 248/221.11 |
| 2009/0294612 A1 | * | 12/2009 | Cline ..................... 248/221.11 |
| 2010/0084525 A1 | * | 4/2010 | Bishop ....................... 248/201 |
| 2010/0127141 A1 | * | 5/2010 | Chan et al. ............. 248/220.22 |

* cited by examiner

*Primary Examiner*—Ramon O Ramirez
(74) *Attorney, Agent, or Firm*—McHale & Slavin, P.A.

(57) ABSTRACT

A securing assembly for enabling a structure, such as a display case, to be mounted onto a slat wall is disclosed. The securing assembly includes a first and a second bracket which are securable to each other without the use of tools or adhesives. The first bracket includes a plurality of sections, secured together, which enable the first bracket to be secured to a slat wall without the use of tools or adhesives. The second bracket includes a first portion securable to the first bracket and a second portion which can be secured to a structure with fasteners. In order to mount a structure on a slat wall the second bracket secured to the structure, the first bracket is secured to the slat wall and then the first and second brackets are secured to each other.

8 Claims, 4 Drawing Sheets

MOUNTING BRACKET FOR SLAT WALLS

FIELD OF THE INVENTION

The present invention relates to wall mountable items and the hardware for mounting these items on a slat wall and in particular to a bracket which includes at least two members, namely a first member securable to the slat wall and a second member is secured to an item. The first and second members are readily securable to each other to enable the item to be mounted on the wall.

BACKGROUND OF THE INVENTION

The display of merchandise is very important as it has been well established that the majority of consumers make purchases based on merchandise that displayed rather than stored in box. For this reason it is important that the placement of merchandise be at a location and height that will is readily visible to the consumer.

When all the merchandise will readily fit on a horizontal shelf, the placement of merchandise is not difficult but items behind the first row may be difficult to see. Also, it is difficult to rearrange merchandise on the shelves or try to easily move the merchandise when placed upon a shelf.

When merchandise does not readily fit on a shelf, or the use of a shelf does not provide for proper viewing, the display of the merchandise becomes a problem. One of the solutions has been to provide a wall or vertical service onto which merchandise can be hung for display. A common, well known wall of this type is pegboard. Hangers onto which the merchandise is secured for display can be secured to the pegboard at various locations and various heights. However, because of the many holes in the pegboard, its appearance is not very becoming. An alternative to this is the "slat wall" which presents an improved and more acceptable display appearance.

Slat walls are constructed of members that enable merchandise or items to be readily mounted on and removed from the wall with the use of tools are known. These walls are commonly used in structures which display merchandise offered for sale in retail stores. The walls or structures are available in many convenient lengths which enable them to be custom fit to various retail locations. They can also be mounted on supports which permit relative motion of the walls, i.e. rotation. This type of structure enables more merchandise to be displayed on a given area of floor space. These walls can be provided with inter fitting connections at the top and bottom edges thereof. This enables them to be stacked vertically to form a wall of any desired height without any gaps or unusable areas at the junctions of the connections. Hardware which is used in conjunction with the display of merchandise for sale is readily mounted onto and removed from these walls as necessary. Normally the walls include a substantially horizontal slot or groove which is recessed relative to the vertical front face of the wall. One or more pieces of hardware are secured to the wall utilizing the horizontal slot or groove.

In addition to displaying individual merchandise items, there are situations where a cabinet, enclosure, or other large object is required to be mounted to a slat wall. Currently the only methods of securing a cabinet or enclosure to a slat wall it to use fasteners, such as screws, bolts, or nails. Also, adhesives can be employed to permanently secure the cabinet or enclosure to the slat wall. None of these methods enable the cabinet or enclosure to be readily moved on the slat wall or secured to the slat wall without the use of tools.

A number of patents have attempted to address the current problem of mounting large objects to the wall. U.S. Pat. No. 4,944,416, issued to Peterson et al., disclose a light-weight slotted panel for mounting merchandise of a front face thereof. The panel is formed from a high density light-weight core composed of molded-board expanded plastic foam and is provided with a front facing sheet laminated thereto. Parallel slots are formed in both the core and facing sheet and configured to accept compatible merchandising accessories.

U.S. Pat. No. 4,662,592, issued to Garfinkle, discloses a unitary pegboard hanger assembly which includes a hanger protruding perpendicularly from a hook back plate, a hook member protruding on the opposite side thereof as the hanger, at least one protrusion perpendicular to the hook back plate on the same side thereof as the hook member and proximate thereto. The hanger assembly is sized to snugly fit into a pegboard hole together with the hook member.

U.S. Pat. No. 3,425,568, issued to Albright, discloses an arrangement and system for a visual presentation of information on a classroom or group basis. A wall surface of a room is provided with a plurality of parallel vertically spaced mounting strips which cooperate with the wall surface to form upper and lower retention channels for demountably supporting such items as blackboards, apertures boards, storage cabinets, wardrobes and/or any other items used in a classroom. The mounting strips also provide mounting means for swingably mounting vertically disposed display panels which are used in conjunction with the other items mounted on the walls for instructional purposes.

Accordingly, there exists a need for hardware in the form of a securing assembly which enables a cabinet or other structure to be readily secured to, repositioned on and removed from a "slat wall" without the use of tools or adhesives.

SUMMARY OF THE INVENTION

A securing assembly for enabling a structure, such as a display case, to be mounted onto a slat wall is disclosed. The securing assembly includes a first and a second bracket which are securable to each other without the use of tools or adhesives. The first bracket includes a plurality of sections, secured together, which enable the first bracket to be secured to a slat wall without the use of tools or adhesives. The second bracket includes a first portion securable to the first bracket and a second portion which can be secured to a structure with fasteners. In order to mount a structure on a slat wall the second bracket secured to the structure, the first bracket is secured to the slat wall and then the first and second brackets are secured to each other.

Accordingly, it is an objective of the instant invention to provide a securing assembly which enables a structure to be secured to a slat wall without the use of tools or adhesives.

It is a further objective of the instant invention to enable a structure to be readily attached to and removed from a slat wall without the use of tools or adhesives.

It is yet another objective of the instant invention to enable a structure to be repositioned on a slat wall and moved from one slat wall to another without the use of tools or adhesives.

It is a still further objective of the instant invention to provide a securing assembly comprising at least tow brackets which can be readily secured to and separated from each other without the use of tools.

It is still yet another objective of the instant invention to provide a securing assembly which permits an adjustment between each of a plurality of separate securing assemblies to enable a structure to be readily mounted onto, removed from and repositioned on a slat wall.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 3:
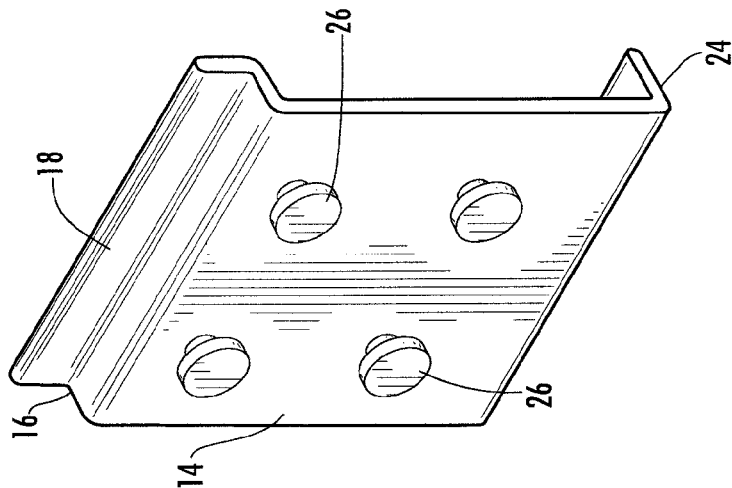
FIG. 3 is a front perspective view of the first bracket.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Referring to FIGS. 1-9 the securing assembly of the present invention will now be described. The securing assembly comprises two elements of brackets. A first bracket 10 and a second bracket 12. The first and second brackets are constructed and arranged to be secured to surfaces of objects, such as walls and cabinets, and also to each other. The first bracket 10 can be secured to a wall, in particular a slat wall, without the use of tools. The first and second brackets 10, 12 can also be secured to each other without the use of tools.

Figure 8:
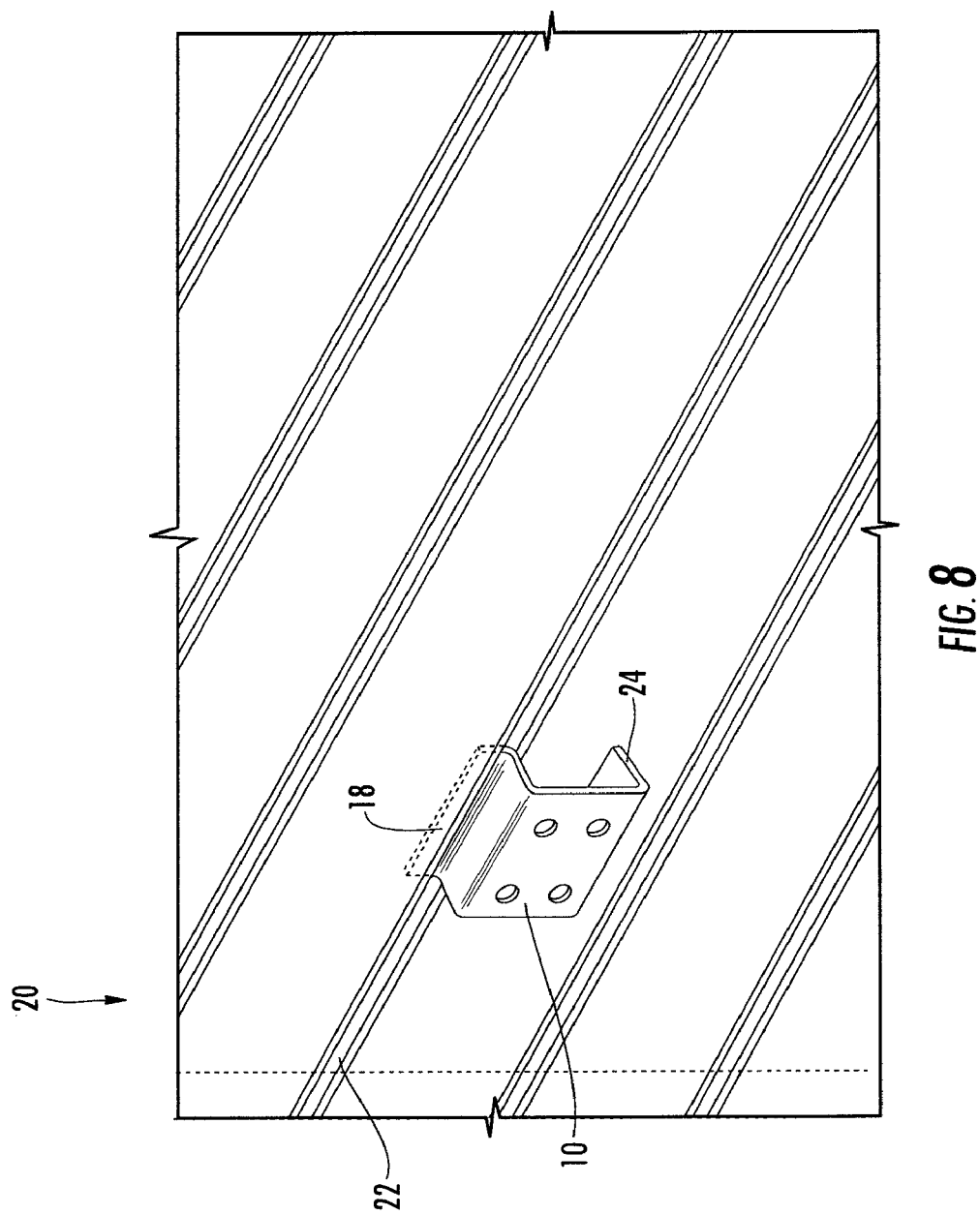
FIG. 8 is a perspective view of the first bracket secured to a slat wall.

Referring now to FIGS. 1-3 and 8 the first bracket will be described. The first bracket 10 includes a first section or element 14 which is substantially planar. A second section or element 16 is connected to the first section and extends away from the first section in a plan that is substantially perpendicular to the first section. While it is preferred that the planes of the first and second sections be substantially perpendicular to each other, they can be in planes which have other non-perpendicular relationships to each other. A third section 18 is connected to and extends away from the second section in a plan that is substantially perpendicular to the second section. While it is preferred that the planes of the second and third sections be substantially perpendicular to each other, they can be in planes which have other non-perpendicular relationships to each other. The third section 18 helps to secure the first bracket to a wall 20 (FIG. 8), such as a slat wall, by extending in a slot or slat which is in a plane behind a front plane of a slat wall and holding the first bracket onto the wall as illustrated in FIG. 8.

The first bracket can be secured to the slat wall be placing the first bracket so that the third section is substantially perpendicular to the slat or slot 22 and then rotating the first bracket downwardly until the third section engaged the rear portion of slot 22 and the opposite end of the first bracket engages the front plane of the slat wall. Removal of the first bracket from the slat wall involves reversing the hereto for listed steps. In this manner the first bracket can be secured to and removed from a wall without the use of tools.

The first bracket further includes a fourth section or element 24 connected to the first section and extending away from the first section in a plan that is substantially perpendicular to the first section. The fourth section is connected to the first section at an opposite side or end thereof from the second section. While it is preferred that the planes of the first and fourth sections be substantially perpendicular to each other, they can be in planes which have other non-perpendicular relationships to each other. The fourth section 24 assists in securing the first bracket to the wall 20 and aligning the first section, with respect to the wall, in a manner which permits a second bracket 12 to be readily secured to the first bracket 10 without the use of tools.

Figure 2:
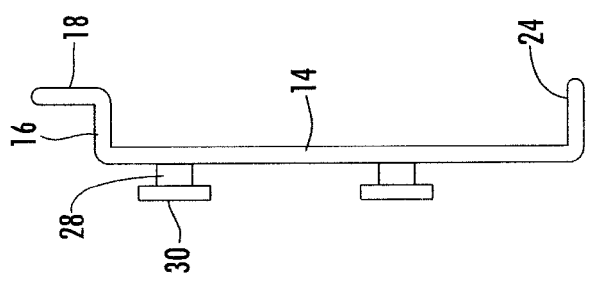
FIG. 2 is an end view of the first bracket.
Figure 1:
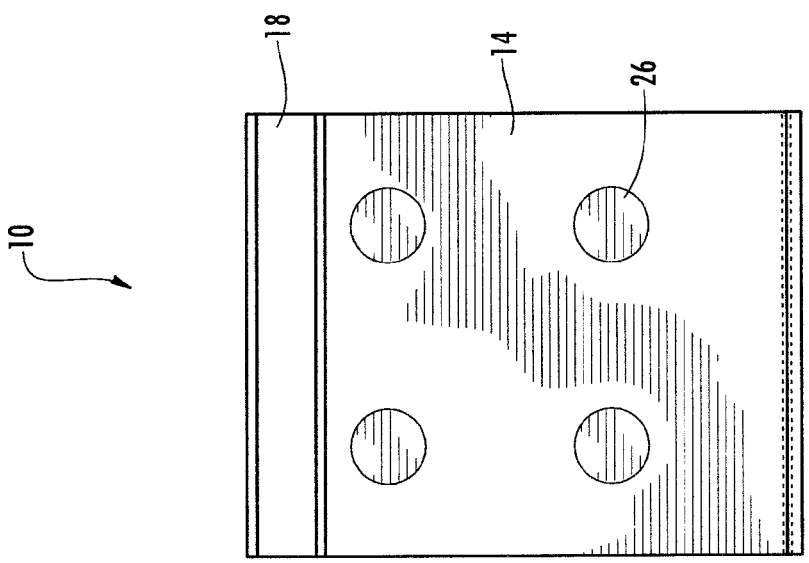
FIG. 1 is a front view of a first bracket of the present invention.

The first bracket 10 includes at least one and preferably a plurality of first securing elements or projections 26 attached to the first section. The first securing elements or projection 26 comprise a first portion 28 and a second portion 30 (FIG. 2). The diameter of the second portion 30 is larger than the diameter of the first portion 28. Also the second portion 30 is spaced from the first section 14 of the first bracket.

Figure 5:
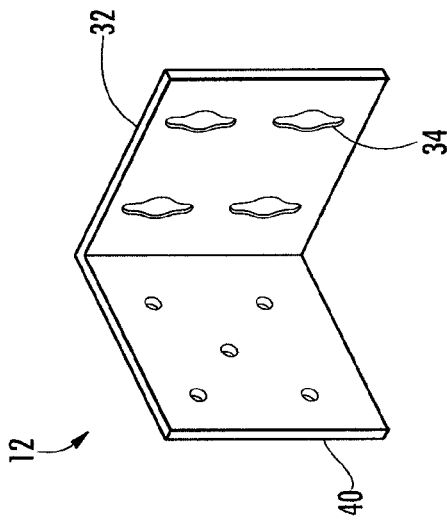
FIG. 5 is a front perspective view of the second bracket.
Figure 7:
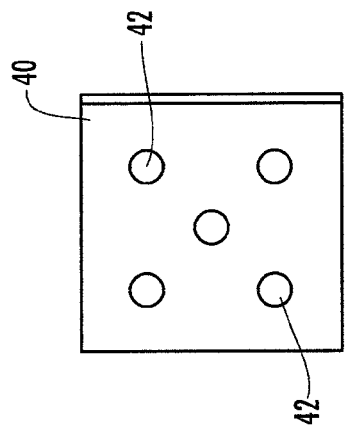
FIG. 7 is a side view of the second bracket.
Figure 6:
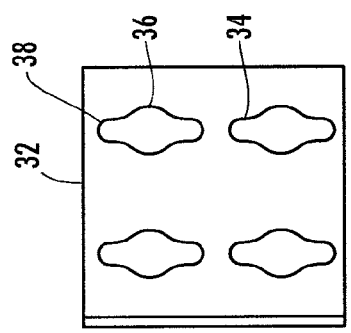
FIG. 6 is a front view of the second bracket.

Referring to FIGS. 5-7 the second bracket 12 will now be described. The second bracket 12 includes a first portion 32. This first portion 32 includes second securing elements 34 which are apertures that are preferably keyhole shaped (FIGS. 5 and 6). Each aperture 34 includes a larger portion 36 and a smaller portion 38. The larger portion 36 is sized to permit the second portion 30 of the projection 26 on the first bracket to pass therethrough. The smaller portion 38 is sized to permit the first portion 28 of projection 26 to pass therethrough and prohibit the second portion 30 of projection 26 from passing therethrough.

In addition the distance between the surface of the second portion 30 that is closest to the first section 14 of the first bracket and the surface of the first section 14 of the first bracket is substantially the same as the thickness of the first portion 32 of the second bracket 12.

This relationship between the size of the apertures 34, the size of the projections 26 and the spacing of second portion 30 from the surface of the first section 14 enables the first and second brackets 10, 12 to be secured to each other without the use of tools. While the first portion 28 and second portion 30 of projection 26 are illustrated as circular, they can be any other shape. In addition, while the larger portion 36 and smaller portion 38 of aperture 34 are illustrated as circular, they can be any other shape. The only criteria of relationship between the different shapes of first portion 28, second portion 30, larger portion 36 and smaller portion 38 is that the second portion 30 can pass through large portion 36 and not pass through the smaller portion 38.

Figure 4:
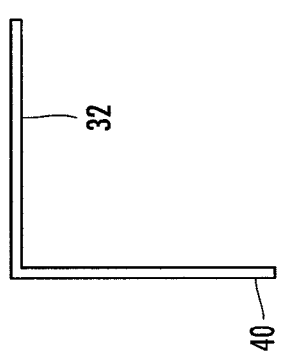
FIG. 4 is a top view of a second bracket of the present invention.
Figure 9:
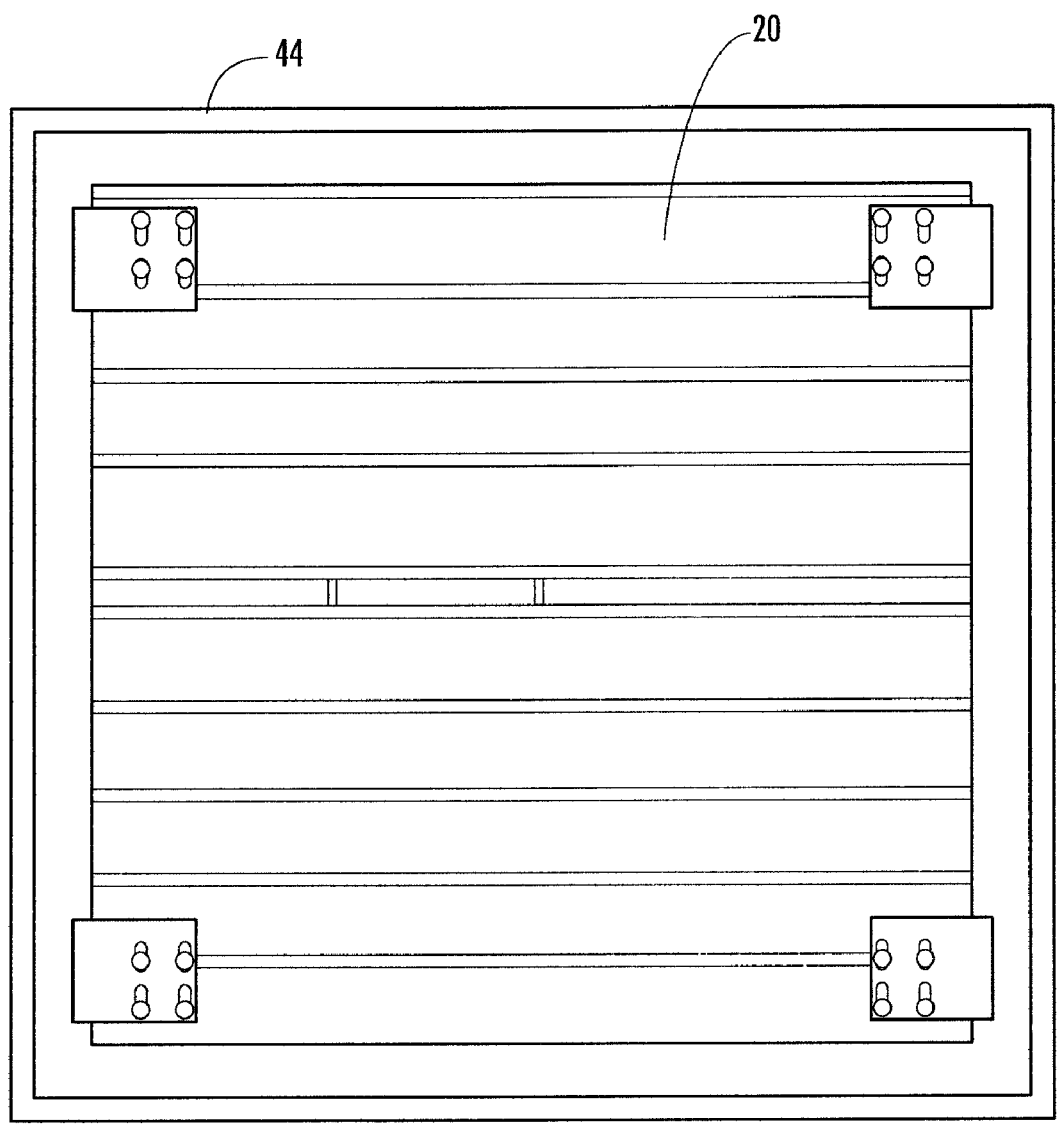
FIG. 9 is an illustration of a structure secured to a slat wall utilizing the securing assembly of the present invention.

The second bracket 12 includes a second section 40 (FIGS. 4, 5 and 7). The second section 40 is secured to the first section 32 of the second bracket in a substantially perpendicular relationship. It can also be secured in other non-perpendicular relationships. The second section 40 includes at least one and preferably a plurality of third securing elements 42 (FIGS. 5 and 7). These third securing elements 42 are preferably apertures. While circular apertures 42 are illustrated any other shaped apertures can be employed. Fasteners (not shown) can pass through apertures and be secured or attached to a structure 44 (FIG. 9). The fasteners securely attach the second bracket to the structure 44. The securing relationship between the first 10 and second 12 brackets heretofore described, attach the first and second brackets together. Finally, the securement or attachment of the first bracket to the slat wall, heretofore described, enables a structure to be secured to a slat wall without the use of tools after the second bracket is secured to the structure. This additionally enables a structure to be readily moved around on a slat wall and moved from one slat wall to another without the use of tools. One of the different types of structures could be a display case for displaying items for sale.

Each of the securing assemblies is constructed and arranged to permit an adjustment between each of a plurality of separate securing assemblies secured to a structure and/or slat wall such that a structure to be readily mounted onto, removed from and repositioned on a slat wall.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A securing assembly for mounting large objects to a slat wall, comprising:
a first bracket constructed and arranged to be releasable secured to a wall without the use of tools, said first bracket having a substantially planar first section, a second section connected to said first section and extending away from said first section, a third section connected to said second section, said third section extending in a plane substantially parallel to a plane of said first section; the first, second and third sections of said first bracket are secured together enabling said first bracket to be releasably secured to and removed from a wall without the use of tools, said first section including first securing elements, said first securing elements are projections which are secured to and extend outwardly from said first section;
a second bracket constructed and arranged to be secured to a structure, said second bracket including a first portion and a second portion, said first portion including second securing elements, said first and said second securing elements are constructed and arranged to cooperatively engage each other respectively thereby securing said first bracket to said second bracket, said second portion of said second bracket including third securing elements, said third securing elements are constructed and arranged to secure said second bracket to a structure.

2. The assembly of claim 1 wherein said first bracket includes a fourth section, said fourth section connected to and extending away from said first section, said fourth section constructed and arranged to position said firsts section of said first bracket substantially parallel to a wall.

3. The assembly of claim 1 wherein said second securing element includes at least one aperture, said at least one projection cooperative secured to said at least one aperture thereby securing said first bracket to said second bracket without the use of additional fasteners.

4. The assembly of claim 3 wherein said at least one aperture is in the shape of a keyhole, said at least one projection includes a first portion having a first diameter secured to said first bracket, said at least one projection includes a second portion, said second portion having a diameter larger than said first diameter of said first portion, said second portion of said at least one projection sized to pass through a larger portion of said keyhole shaped said at least one aperture and not pass through a smaller portion of said keyhole shaped said at least one aperture, said first portion of said at least one projection sized to pass through both said larger and said smaller portion of said key hole shaper aperture.

5. The assembly of claim 4 wherein said smaller portion of said keyhole shaped said at least one aperture and said larger portion of said at least one aperture are in substantial vertical alignment.

6. The assembly of claim 4 wherein said smaller portion of said keyhole shaped said at least one aperture cooperatively engages said first portion of said at least one projection whereby said first and said second bracket are connected to each other.

7. The assembly of claim 6 wherein said second portion of said at least one projection cooperatively engages said first portion of said second bracket, the distance between said second portion of said at least one projection and said first section of said first bracket is substantially equal to a thickness of said first portion of said second bracket, said first and said second brackets are connected to each other in a juxtaposed relation that prevents substantial relative movement of said first bracket away from said second bracket.

8. The assembly of claim 3 wherein each of said securing assemblies is constructed and arranged to permit an adjustment between each of a plurality of separate securing assemblies secured to a structure and/or slat wall such that a structure to be readily mounted onto, removed from and repositioned on a slat wall.

* * * * *